United States Patent [19]

McQuade

[11] Patent Number: 4,834,065
[45] Date of Patent: May 30, 1989

[54] FIELD COOKER

[76] Inventor: Robert L. McQuade, 2933 N. Holman St., Portland, Oreg. 97217

[21] Appl. No.: 106,056

[22] Filed: Oct. 7, 1987

[51] Int. Cl.[4] .................. A47G 23/04; A47J 39/00
[52] U.S. Cl. ............................ 126/262; 220/205; 220/373
[58] Field of Search ............... 126/38, 43, 59.5, 261, 126/262; 220/203, 205, 373, 374

[56] References Cited

U.S. PATENT DOCUMENTS

| | | | |
|---|---|---|---|
| 166,520 | 8/1875 | Gervais | 126/261 |
| 972,304 | 10/1910 | White | 126/262 |
| 1,354,044 | 9/1920 | Krüger | 126/261 |
| 1,371,297 | 3/1921 | Canovsky | 126/368 |
| 2,327,412 | 8/1943 | Fink | 220/4 |
| 2,502,434 | 4/1950 | Creitz | 126/266 |
| 2,575,299 | 11/1951 | Scheel | 126/261 |
| 2,581,131 | 1/1952 | Naranick | 126/262 |
| 2,733,709 | 2/1956 | Sukacev | 126/261 |
| 3,245,400 | 4/1966 | Bowman | 126/261 |
| 3,262,445 | 7/1966 | Stults et al. | 126/262 |
| 3,561,424 | 2/1971 | Failla | 126/262 |
| 3,566,857 | 3/1971 | Price | 126/262 |
| 4,165,816 | 8/1979 | Tupper | 220/203 |
| 4,424,798 | 1/1984 | Volk | 126/262 |
| 4,506,654 | 3/1985 | Zellweger et al. | 126/262 |

FOREIGN PATENT DOCUMENTS

| | | | |
|---|---|---|---|
| 73654 | 8/1916 | Austria | 126/262 |
| 181067 | 2/1907 | Fed. Rep. of Germany . | |
| 184173 | 4/1907 | Fed. Rep. of Germany | 126/261 |
| 628465 | 3/1936 | Fed. Rep. of Germany . | |
| 1429997 | 3/1969 | Fed. Rep. of Germany . | |
| 708615 | 7/1931 | France . | |
| 228185 | 8/1943 | Switzerland . | |
| 357174 | 9/1961 | Switzerland . | |
| 163918 | 6/1921 | United Kingdom . | |
| 212973 | 3/1924 | United Kingdom . | |
| 285176 | 2/1928 | United Kingdom | 126/261 |

Primary Examiner—Samuel Scott
Assistant Examiner—Allen J. Flanigan
Attorney, Agent, or Firm—Kolisch, Hartwell & Dickinson

[57] ABSTRACT

A portable field cooker is taught which enables a user to heat food in an inner vessel thereof while the user remains on the move. The cooker includes a tubular body having an outer housing, and an inner, food containing vessel. Insulation means are provided between the housing and the vessel. A heating chamber is removably secured to the base of the housing for holding a fuel-containment-dish which is removably received in the heating chamber. The fuel-containment-dish is operable to carry an ash-producing fuel supply therein, in an ignited condition, and to retain the ignited fuel supply therein, thus preventing the escape of ignited material from the heating chamber.

19 Claims, 1 Drawing Sheet

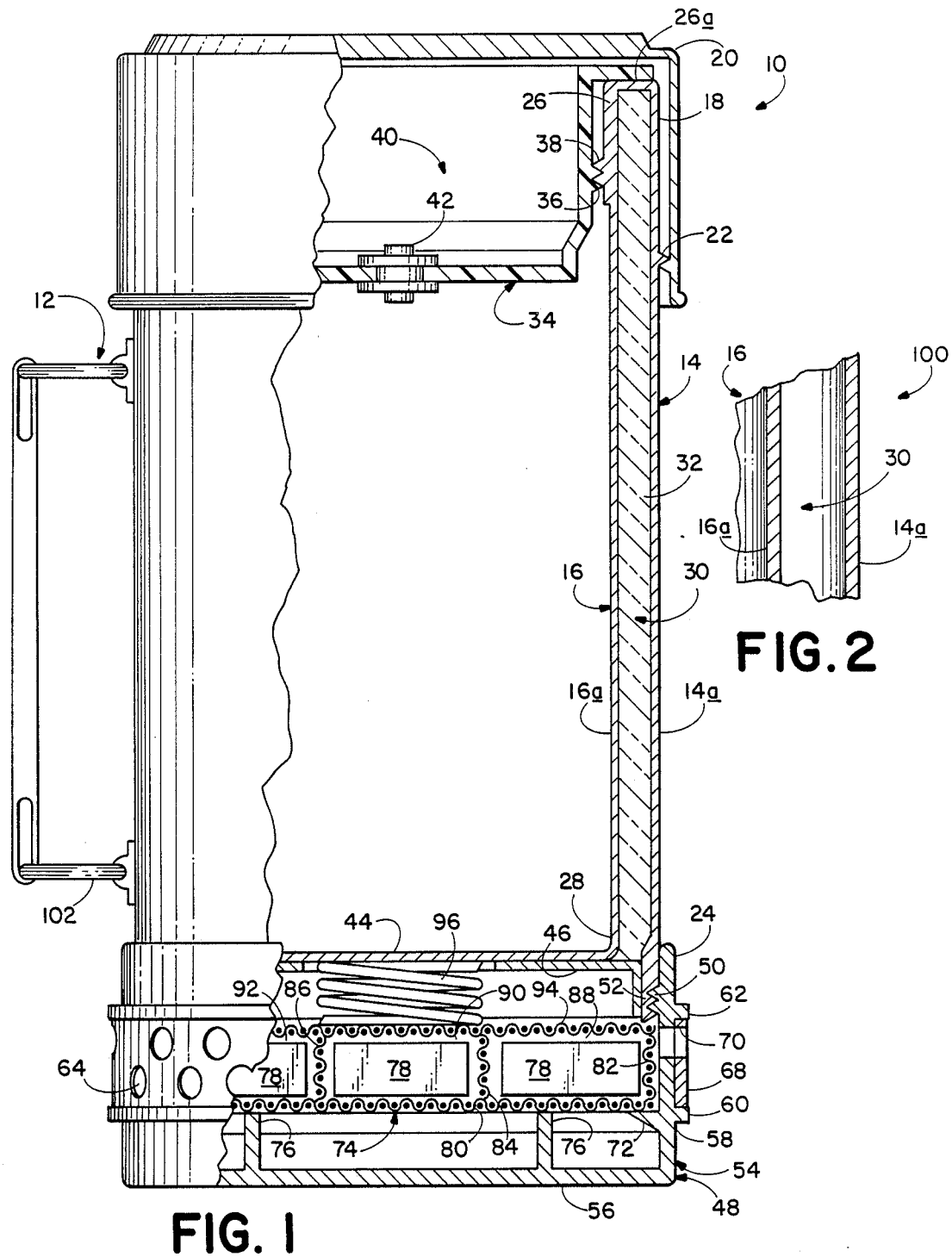

FIELD COOKER

BACKGROUND OF THE INVENTION

A variety of field cookers are known. The cookers generally include some form of outer housing, a cooking container which is received in the housing, a cover for the cooking container and means for containing a heat source, generally under or along side of the food container.

Although the word portable is used in conjunction with many known cookers, the cookers are portable only in the sense that they may be carried from one location to another intermediate their use as a food warming container. Known portable field cookers are not practical for heating or cooking food while on the move and the known units are certainly not acceptable as portable cooking units for use while being carried by a backpack or hiker while the carrier is on the move and the cooker is warming the food carried therein.

As food in a cooker is heated, it will tend to expand. Although a number of cookers are known which include pressure relief valves to allow the escape of gases from the interior of the cooking vessel, such structure is depend upon the cooker being in an upright, stationary condition. If the cooker is being transported, particularly by a person on foot, a certain amount of agitation will occur and it is likely that not only will gas escape from the interior of the vessel, but that the contents of the vessel will escape. Known cookers do not provide any means for retaining escaped contents of the vessel when the cooker is being transported.

Known portable field cookers, if transported, particularly by a person on foot, would pose a significant danger to the carrier and to the environment through which the cooker is carried if a fuel supply is burning therein. Known field cookers rely on liquid or solid fuel for heating the contents thereof and, particularly in the case of liquid fuel, carrying such a cooker when the fuel is ignited could be quite dangerous. In the case of solid fuel, the fuel is likely to create embers and sparks, which would exit the cooker and create potential fire hazard to the environment.

SUMMARY OF THE INVENTION

The portable field cooker of the invention includes a tubular body having an elongate outer housing having a top and a base, and an elongate inner vessel for containing food therein. The inner vessel is spaced apart from and secured adjacent the ends thereof to the housing and has an open top of its own and heat-transmitting means at the base thereof. Some form of insulation is provided between the outer housing and the inner vessel.

A heating chamber is removably secured to the base of the housing and includes plural air-vent apertures about the periphery thereof and means for closing the air-vent apertures. A fuel-containment-dish is removably received in the heating chamber for carrying a fuel supply to heat the contents of the vessel. The dish is constructed and arranged to allow air to reach the fuel contained therein and includes a non-combustible base having an upwardly flanged rim thereabout. The rim is constructed and arranged to prevent ashes from the fuel from spilling out of the chamber through the vents about the heating chamber. Plural partitions extend upward from the base and define plural fuel-receiving bays. The dish also includes a cover which has a heat-conducting mechanism attached thereto. The heat-conducting mechanism is operable to conduct heat from the fuel supply to the heat-transmitting means in the base of the inner vessel. The cover is operable to retain the fuel supply in the base.

An object of the instant invention is to provide a portable cooker which is operable to heat the food contents therein while being transported, particularly by a person on foot.

Another object of the instant invention is to provide a portable field cooker which has a removable heating chamber secured thereto and provides means to safely carry a burning fuel supply while the cooker is being transported.

Another object of the instant invention is to provide a portable field cooker which provides means to allow expansion of food carried therein and which will retain the contents thereof if same should overflow the vessel during heating.

These and other objects and advantages of the instant invention will become more fully apparent as the description which follows is read in conjunction with the drawings.

DESCRIPTION OF THE DRAWINGS

FIG. 1 is a front elevation of the field cooker of the invention, with portions broken away to show interior detail thereof.

FIG. 2 is a slightly enlarged, partial sectional view through a second embodiment of the tubular body of the invention.

DETAILED DESCRIPTION OF THE PREFERRED EMBODIMENTS

Turning initially to FIG. 1, the portable field cooker of the invention is shown generally at 10. Cooker 10 includes a tubular body, shown generally at 12, which includes an elongate outer housing 14 and an elongate inner vessel 16 received in housing 14.

Housing 14 has a top portion 18 that is covered by a removable, cup-like cap 20. Cap 20 is secured to housing 14 by suitable, conformal threads 22 formed on the exterior of housing 14 and the interior of cap 20. Housing 14 futher includes a base portion 24 which, in the preferred embodiment, extends beyond the lower end of vessel 16.

Vessel 16 is suitable for containing a food product, to be carried and heated therein. Vessel 16 is secured adjacent the top, or one, end 26 thereof and the other, or base end 28 thereof to housing top 18 and base 24, respectively. Specifically, the side wall 16a of vessel 16 and side wall 14a of housing 14 are spaced apart from one another and include insulation means therebetween. In the first embodiment, insulation means take the form of a thermal insulation material, such as fiber or spun glass, rock wool, etc.

In the second embodiment of the cooker, shown partially at 100 in FIG. 2, insulation means 30 takes the form of a vacuum formed between the walls of the vessel and the housing. In this case, at least one of the outer surfaces of the vessel or the inner surface of the housing is coated with a metal having thermal insulating properties.

Returning to FIG. 1, top 26 of vessel 16 may be seen to have an open region at its top which is closed by a seal 34. Seal 34, also referred to herein as inner-vessel-closure means, includes threads 36 about the periphery thereof which cooperate with threads 38 formed about the inner periphery of top 26, to provide a sealing fit into the open top of the vessel. Seal 34 includes a cup-like recess 40 which has a pressure relief valve 42 located in the bottom thereof. Relief valve 42 is operable to allow the contents of vessel 16 to expand into the recess of seal 34 should the contents of the vessel expand as a result of heating. In the preferred embodiment, cap 20 is operable to retain any expanded food material in the recess of seal 34.

The base 44 of vessel 16 is operable as heat-transmitting means to transmit heat to the contents of the vessel.

Vessel top 26 includes a flange 26a which extends about the periphery thereof and which is secured to housing top 18 as by welding or other suitable joining techniques. A base ring 46 extends about the inner periphery of housing base 24 and vessel base 28 and is fixed thereto, again as by welding or other suitable joining techniques. Ring 46 has a bore through the center thereof to expose the base of the vessel.

A heating chamber 48 is secured to the base of body 12. Such securing is accomplished by means of threads 50 on chamber 48 and conformal threads 52 on the base of body 12. Chamber 48 includes a container 54 having a base 56 and side walls 58 extending upward from base 56 about the periphery thereof. Side wall 58 has a pair of spaced apart protruding ridges 60, 62 extending about the periphery thereof. Plural air-vent apertures 64 are located in between ridges 60, 62 in the preferred embodiment and are disposed about the periphery of side wall 58. In the preferred embodiment, air-vent apertures are arranged in two rows and range between 18 and 20 in number. The apertures are approximately $\frac{3}{8}$" in diameter.

A collar 68 is disposed between ridges 60, 62 and is rotatably mounted about the periphery of side wall 58. Collar 68 includes a set of ports 70 which are coincident with vents 64. Collar 68 is rotatable to alternately conceal and expose air-vents 64 by alignment and misalignment of ports 70 with the air-vents.

Container 54 is formed of material having low thermal conductivity, such as a polymer material having properties of low thermal conductivity. Alternately, the container may include a sandwich arrangement wherein a layer of a-wool material is encased between suitable metal and/or plastic layers forming an inner and outer container shell. Container 54, in the preferred embodiment, includes means 72 for supporting a fuel-containment-dish 74. In the preferred embodiment, means 72 takes the form of a lip which extends around the interior of container 54 above base 56. Additionally, supports 76 may be provided to support dish 74.

Fuel-containment-dish 74 is removably received in heating chamber 48 and is constructed and arranged to allow an air supply to reach a fuel supply. It is envisioned that the fuel supply which will be used in the invention will be in the form of charcoal fuel capsules 78 which are readily available and which provide a steady, relatively long lasting source of heat. In the preferred embodiment, containment dish 74 includes a non-combustible, wire mesh base 80 which has an upwardly flanged rim 82 extending about the periphery thereof. Partitions 84, 86 are provided to separate the fuel capsules and define plural, fuel-receiving bays 88, 90 and 92. A cover 94 is provided to retain the fuel capsules in the bays and has heat-conducting means in the form of a coil spring 96 attached thereto. Spring 96 is operable to bridge the air gap between fuel cells 78 and heat-transmitting means 44. Spring 96 is fixed to the top of cover 94 and is in direct contact with heat-transmitting means 44.

Fuel-containment-dish 74 is constructed and arranged to retain ash in chamber 48 so that the ash will not spill out of the chamber through apertures 64 and ports 70. To this end, in the preferred embodiment, dish 74 is constructed of a wire mesh screen which will allow air to circulate to the fuel but which will cause the fuel to remain in a substantially compacted mass. Partitions 84, 86 are operable to prevent the collision between adjacent fuel capsules, thereby maintaining the capsule relatively intact. The cooker is intended to be carried in a substantially upright condition which would result in any ash particles which do become loose from the mass dropping into the free space between base 80 of the fuel-containment-dish and base 56 of the heating chamber.

Cooker 10 includes means for carrying the cooker, which in the preferred embodiment takes the form of a collapsible handle 102 which is secured to the side of body 12. Handle 102 may be secured to a backpack or to the carrier's belt by means of a split-D ring or a carabiner and may be carried with food contained in vessel 16 and fuel capsules ignited in heating chamber 48. Thus a hiker is able to continue moving while a meal is being heated in the cooker of the invention.

The cooker is operable to heat food contained vessel 16 while allowing the food to expand through pressure relief valve and be retained in recess 40. The fuel-containment-dish prevents the spilling of ignited fuel out of the heating chamber thus providing a safe fuel supply which may be carried while ignited.

Although a preferred embodiment and a variation thereof have been disclosed herein, further modifications and variations may be made thereto without departing from the scope of the invention as defined in the appended claims.

It is claimed and desired to secure as Letters Patent:
1. A portable field cooker comprising :
an elongate outer housing having a top and a base;
an elongate inner vessel for containing food therein, spaced apart from and secured adjacent the ends thereof to said housing, said vessel having an open top at one end thereof and heat-transmitting means at the other end thereof;
insulation means located between said housing and said vessel;
a heating chamber removably secured to the base of said housing having plural air-vent apertures about the periphery thereof; and
a fuel-containment-dish removably received in said chamber for carrying an ash-producing fuel supply to heat the contents of said vessel, said dish being constructed and arranged to allow air to reach the fuel contained therein and including a non-combustible base, an upwardly flanged rim and having plural partitions extending upwards from said base defining plural fuel receiving bays, said dish further including a cover having heat-conducting means attached thereto, said cover being operable to retain the fuel supply in said bays and said heat-conducting means being constructed and arranged to contact the heat-transmitting means thereby to bridge an air gap between the fuel supply and the heat-transmitting means to conduct heat to said inner vessel, said rim being constructed and arranged to prevent ashes from the fuel from spilling out of the chamber through the vent apertures.

2. The cooker of claim 1 which further includes inner closure means sealingly fittable into the open top of said vessel, said closure means having a cup-like recess with a pressure relief valve in the base thereof, said pressure relief valve being operable to allow the contents of the inner vessel, when heated, to expand into said recess and the recess being operable to retain the expanded contents of said inner vessel therein.

3. The cooker of claim 1 wherein said insulation means comprise a thermal insulation material.

4. The cooker of claim 1 wherein said insulation means comprise a vacuum and at least one of the outer surface of the vessel and the inner surface of the housing is plated with a thermal insulating metal.

5. The cooker of claim 1 wherein said heating chamber includes a side wall having dual protruding ridges about the periphery thereof and said air-vent apertures are located between said ridges, the cooker further including a collar rotatably mounted on the outer periphery of said heating chamber between said ridges, said collar having ports therein coincident with said air-vent apertures, said collar being rotatble to alternately conceal and expose said air-vent apertures.

6. The cooker of claim 1 wherein said heating chamber includes fuel-containment-dish support means therein for supporting said dish in said heating chamber.

7. A portable field cooker comprising:
an elongate outer housing having a top, a removable cap for sealing said top, and a base;
an elongate inner vessel for containing food therein spaced apart from and secured adjacent the ends thereof to said housing, said vessel having an open top, and heat-transmitting means at the base thereof;
insulation means located between said housing and said vessel;
a heating chamber removably secured to the base of said outer housing, wherein said heating chamber includes a side wall having dual protruding ridges about the periphery thereof, air-vent apertures located between said ridges, a collar rotatably mounted on the outer periphery of said heating chamber between said ridges, said collar having ports therein coincident with said air-vent apertures, said collar being rotatable to alternately conceal and expose said air-vent apertures; and
inner closure means sealingly fittable into the open top of said vessel, said closure means having a cup-like recess with a pressure relief valve in the base thereof, said pressure relief valve being operable to allow the contents of the inner vessel, when heated, to expand into said recess and the recess and said cap being operable to retain the expanded contents of said inner vessel therein.

8. The cooker of claim 7 which further includes a fuel-containment-dish removably received in said chamber for carrying an ash-producing fuel supply to heat the contents of said vessel, said dish being constructed and arranged to allow air to reach the fuel contained therein and including a non-combustible base, an upwardly flanged rim and having plural partitions extending upwards from said base defining plural fuel-receiving bays, said dish further including a cover having heat-conducting means attached thereto, said cover being operable to retain the fuel supply in said bays and said heat-conducting means being constructed and arranged to contact the heat-transmitting means thereby to bridge an air gap between the fuel supply and the heat-transmitting means to conduct heat to said inner vessel, said rim being constructed and arranged to prevent ashes from the fuel from spilling out of the chamber through the vents apertures.

9. The cooker of claim 7 which further includes means for carrying, safely, the cooker when an ash-producing fuel supply is ignited therein.

10. The cooker of claim 7 which further includes means for supporting said dish in said heating chamber in a spaced apart relationship to the bottom side of the chamber.

11. The cooker of claim 10 wherein said means for supporting includes a lip extending about the interior of said heating chamber above the bottom thereof.

12. The cooker of claim 8 wherein said means for carrying includes a collapsible handle mounted on the side of said outer housing.

13. The cooker of claim 7 wherein said insulation means comprise a thermal insulation material.

14. The cooker of claim 7 wherein said insulation means comprise a vacuum and at least one of the outer surface of the vessel and the inner surface of the housing is plated with a thermal insulating metal.

15. In a field cooker, for transporting food therein while an ash-producing fuel supply is ignited, including a tubular body having an inner vessel for heating food contained therein having an open top and heat-transmitting means at the base thereof, an outer housing having an open top and a cup-like cap therefore and a heating chamber secured to the base thereof having air-vents therein, the improvement comprising:
inner-vessel-closure means sealingly fittable into the open top of the inner vessel, said closure means having a cup-like recess in an upper side thereof and a pressure relief valve extending between the base thereof and said recess, said pressure relief valve being operable to allow the contents of the inner vessel, when heated, to expand into said recess, said recess and the cap being operable to retain the expanded contents of said inner vessel; and
a fuel-containment-dish removably receivable in the heating chamber, said dish being constructed and arranged to allow air to reach the fuel supply contained therein and including a non-combustible base an upwardly flanged rim extending about the periphery of the base, and plural partitions extending upwardly from said base defining plural fuel-receiving bays in said dish, said dish further including a cover having heat-conducting means thereon, said cover being operable to retain fuel in said bays and said heat-conducting means being constructed and arranged to contact the heat-transmitting means to bridge the air gap between the fuel supply and the heat-transmitting means thereby to conduct heat to said inner vessel, said rim being constructed and arranged to prevent ashes from the fuel supply from spilling out of the chamber through the air-vents.

16. The cooker of claim 15 wherein said heating chamber includes a side wall having dual protruding ridges about the periphery thereof and said air-vents are located between said ridges, the cooker further including a collar rotatably mounted on the outer periphery of said heating chamber between said ridges, said collar having ports therein coincident with said air-vents, said collar being rotatable to alternately conceal and expose said air-vents.

17. The cooker of claim 15 which further includes means for carrying, safely, the cooker when the fuel supply is ignited therein.

18. The cooker of claim 14 wherein said means for carrying includes a collapsible handle mounted on the side of said outer housing.

19. The cooker of claim 15 which further includes means for supporting said fuel-containment-dish in the heating chamber.

* * * * *